US006214088B1

(12) United States Patent
Karamanev et al.

(10) Patent No.: US 6,214,088 B1
(45) Date of Patent: Apr. 10, 2001

(54) IMMOBILIZED BIOREACTOR METHOD FOR SULPHIDIC MINERALS AND OTHER PARTICULATE SOLIDS

(75) Inventors: Dimitre Gueorguiev Karamanev; Argyrios Margaritis, both of London (CA)

(73) Assignee: The University of Western Ontario, London (CA)

( * ) Notice: Subject to any disclaimer, the term of this patent is extended or adjusted under 35 U.S.C. 154(b) by 0 days.

(21) Appl. No.: 09/371,118

(22) Filed: Aug. 10, 1999

(51) Int. Cl.[7] .................................. C22B 3/18; C22B 3/24
(52) U.S. Cl. ..................... 75/711; 210/912; 210/610; 210/617; 210/622; 75/743; 75/744; 423/658.5
(58) Field of Search .......................... 75/743, 744, 711; 423/658.5; 210/610, 617, 622, 912

(56) References Cited

U.S. PATENT DOCUMENTS 5,084,389 * 1/1992 Lakshmanan et al. .............. 435/176

FOREIGN PATENT DOCUMENTS 9-249812 * 9/1997 (JP) .

OTHER PUBLICATIONS

Derwent Abstract, Acc No. 1997–522034 JP 09249812 A, Sep. 22, 1997.*
"Hydrodynamics of Soil Immobilization in the Immobilized Soil Bioreactor"; Karamanev et al.; *AICHE Journal* vol. 43 No. 5 May 1997, pp 471–476.
"Soil Immobilization New Concept for Biotreatment of Soil Contaminants" Karamanev et al; *Biotechnology & Bioengineering*, vol. 57 No. 4 Feb. 20, 1998, pp 1163–1180.

* cited by examiner

*Primary Examiner*—Roy King
*Assistant Examiner*—Tima McGuthry-Banks
(74) *Attorney, Agent, or Firm*—C. A. Rowley

(57) ABSTRACT

A method and apparatus for bioprocessing particles wherein particles are entrapped a porous material and have biologically active microorganisms on their surfaces. A liquid (carrying oxygen and/or nutrients for said microorganisms) is passed through the entrapped particles and microorganisms and microorganisms are active to breakdown said particles. After a suitable period of time the particles are removed from the matrix.

29 Claims, 8 Drawing Sheets

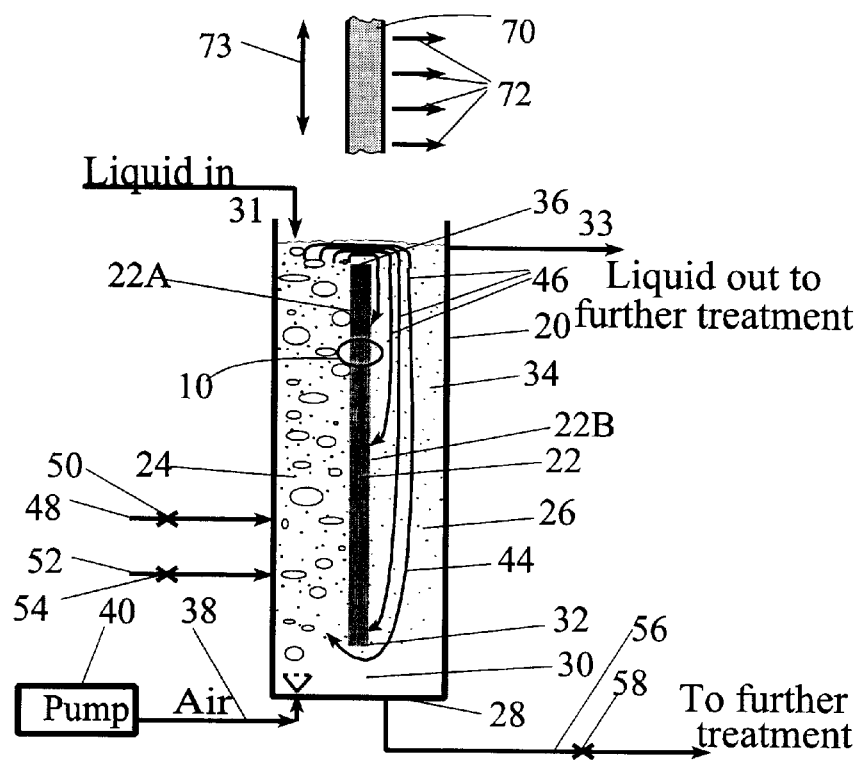
Fig. 1.
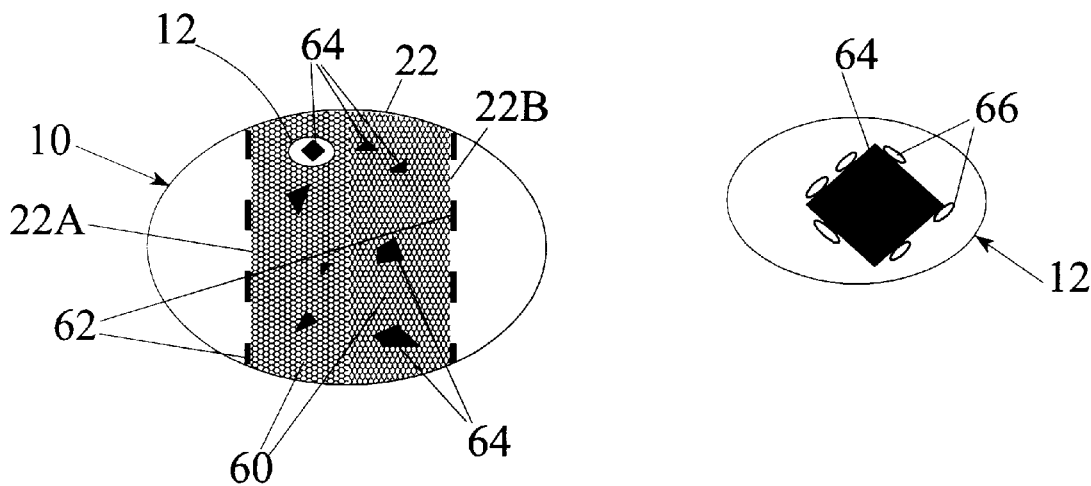
Fig. 2.
Fig. 3.

IMMOBILIZED BIOREACTOR METHOD FOR SULPHIDIC MINERALS AND OTHER PARTICULATE SOLIDS

FIELD OF INVENTION

The present invention relates to bioprocessing of particulate material, more particularly to bioprocessing of sulphidic minerals or other particulate solids with active microorganisms and to an improved apparatus for such processes.

BACKGROUND OF THE INVENTION

Virtually all of the bioreactors presently used for the industrial scale oxidation of particulate solids such as gold-bearing sulfide minerals, copper, zinc, nickel sulphides are slurry reactors, i.e. aerated vessels containing ore slurry which are equipped with mechanical mixer. While considered more efficient than chemical processes for the treatment of sulphidic ore concentrates, current day slurry bioreactors have four major disadvantages:
1. In order to keep the particles (e.g. pyrite) in suspension, it is necessary to apply large amount of mechanical energy for mixing mainly because of the high density of pyrite.
2. The interparticle friction is very strong because of the high solids concentration and the intensive mixing. Since microorganisms grow mainly on the surface of the particles (e.g. sulfide crystals), the particle friction in slurry bioreactors causes detachment of microorganisms which significantly limits the reaction rate. This results in long reaction times (e.g. 3 to 5 days for pyrite).
3. Low oxygen transfer rate due to the presents of suspended solids.
4. Liquid and solid retention times are equal.

The above discussion indicates that both substantial increase in the process efficiency and decrease in energy consumption can be achieved if the bioreaction is carried out under low shear stress conditions and without the need to suspend the particles in liquid.

A recently proposed concept of soil immobilization (see Karamanev et al. "Hydrodynamics of Soil Immobilization in the Immobilized soil Bioreactor" AIChE Journal Vol. 43. No.5 May 1997 pages 1163 to 1170; and Karamanev et al.; "Soil Immobilization: New Concept for Biotreatment of Soil Contaminants" Biothechnology and Bioengineering, Vol 57 No. 4 Feb. 20, 1998 pages 471–476) and the teaching of these publications are incorporated herein by reference. This type of reactor is hereinafter referred to throughout the Application as an immobilized solid particle bioreactor or immobilized bed bioreactor the operation of which is based on the entrapment of solid particles into the pores of a highly porous inert matrix, such as a non-woven textile.

Generally the matrix of an immobilized bed bioreactor will have a wide pore size distribution of between several microns and 2 mm. so that as a slurry containing solids within the same size range as that of the pores of the matrix is circulated repeatedly through the matrix, solid particles get entrapped inside the pores. When soil was used as a solid phase, the resulting structure was named immobilized soil. Immobilized soil particles contain surface-immobilized microorganisms (biofilm). In order to supply the microorganisms with substrate, inorganic salts and oxygen, aqueous solution of these compounds is circulated through the immobilized soil structure.

These immobilized bed bioreactors when used for treating for treatment of solid particles require a system of removing the treated solid particles for further processing, The systems for treating liquids as in the immobilized soil reactors of the prior art or do not provide or teach any systems for removal of solids from the bed.

Due to the depletion of rich ores, mining companies are paying more attention to low-grade ores. The present disclosure will be discussed below with specific reference to gold and the gold industry, but it is to be understood that it is believed the invention has wider application outside of the gold industry (ex other base metals such as copper, zinc and nickel).

The gold in the lower grades of ore (e.g. refractory gold-bearing ores) is encapsulated as fine particles (sometimes on molecular level) in the crystal structure of sulfide (typically pyrite with or without arsenopyrite) ore. This makes it impossible to extract refractory gold by cyanidation since cyanide solution cannot penetrate the pyrite/arsenopyrite crystals and dissolve gold particles, even after fine grinding. To effectively extract gold from these ores, an oxidative pretreatment is necessary to break down the sulphide ore. The most popular methods of pretreatment include nitric acid oxidation, roasting, pressure oxidation and biological oxidation by microorganisms.

Roasting is highly energy consuming and produces off-gases containing sulfur dioxide and arsenic trioxide, which require costly treatment. Both pressure oxidation and oxidation by nitric acid require high pressure, high temperature and/or corrosion-resistant materials.

The biological pretreatment of refractory gold ores is based on the ability of some microorganisms such as *Thiobacillus ferrooxidans* to oxidize and dissolve pyrite and arsenopyrite, thus liberating the entrapped gold particles. Either whole ore or concentrate can be used for biotreatment. Whole ore is usually treated in heaps while concentrate is treated in bioreactors.

The process of microbial oxidation of concentrate is usually carried out in slurry bioreactors with a unit volume of 200 to 1000 m$^3$ at temperatures between 20 and 55° C. and under atmospheric pressure. This process is considered to be less expensive and more environmentally friendly than other methods. However, there are some disadvantages of this method. The bioprocess rate is low: it takes usually between 3 and 5 days to treat the sulfide particles, compared to several hours in the case of chemical processes. The energy consumption is relatively high. This is especially important, taking into account that the power cost is usually between 40 and 60% of the total operating cost of the slurry biooxidation. Therefore, the increase in the bioreaction rate and the reduction of energy consumption are important.

BRIEF DESCRIPTION OF THE PRESENT INVENTION

It is an object of the invention to provide a process and apparatus for bioprocessing particles.

It is a further object of the present invention to provide a system for removal of immobilized material from an immobilized bed bioreactor.

It is a further object to provide a bioprocess for liberating gold from pyrite in an immobilized soil type reactor.

Broadly the present invention relates to a method and apparatus for bioprocessing particles comprising providing an entrapping matrix for said particles, entrapping said particles in said matrix, providing biologically active microorganisms on said particles in said matrix, passing liquid carrying nutrients and oxygen for said microorganisms through said matrix containing said entrapped particles and said microorganisms, permitting said microorganisms to breakdown said particles and form processed particles and processed liquid and recovering said processed particles from said matrix and said processed liquid from the bioreactor.

Preferably, said bioprocessing is carried out in an immobilized bed bioreactor wherein said matrix is substantially vertical and said liquid is made to flow upward on one side of said matrix by air injection and downward on an opposites side of said matrix and a portion of said liquid flows through said matrix from said opposite side to said one side.

Preferably said microorganism cause dissolving of parts of said particles by biochemical reaction of said parts.

Preferably said processed particles are recovered from said matrix by washing said processed particles from said matrix.

Preferably said particles are pyrite and/or arsenopyrite containing gold particles.

Preferably liquid is bled from said vessel as a liquid bleed.

Preferably said particles are sulfidic minerals containing metals including copper, zinc, nickel cobalt and/or manganese and said liquid bleed is further treated to recover said copper, zinc nickel cobalt and/or manganese.

The apparatus for bioprocessing particles of the present invention comprises a vessel, an entrapping matrix for said particles in said vessel, a first passage on one side of said matrix and a second passage for liquid on the side of said matrix opposite said one side, means for passing said liquid in a first direction through said one passage and permitting said liquid to flow in an opposite direction to said first direction in said second passage, a washing system for directing washing liquid through said matrix from one of said first and said opposite sides to remove particles immobilized in said matrix from said matrix to provide removed particles and means for collecting said removed particles and removing them from said vessel.

Preferably, said matrix is substantially vertical and said means for passing liquid comprises means injecting air into said liquid adjacent to a bottom of said first passage.

BRIEF DESCRIPTION OF THE SEVERAL VIEWS OF THE DRAWING(S)

Further features, objects and advantages will be evident from the following detailed description of the preferred embodiments of the present invention taken in conjunction with the accompanying drawings in which;

FIG. 1 is a schematic illustration of an immobilized bed bioreactor.

FIG. 2 is a schematic illustration of a portion of the immobilized bed bioreactor of FIG. 1 within the ellipse 10 shown in FIG. 1.

FIG. 3 is a schematic illustration of a particle (in the illustration a pyrite particle) trapped within the immobilized bed bioreactor of FIG. 1 and contained within the ellipse 12 of FIG. 2.

DETAILED DESCRIPTION OF THE INVENTION

Figure 4:
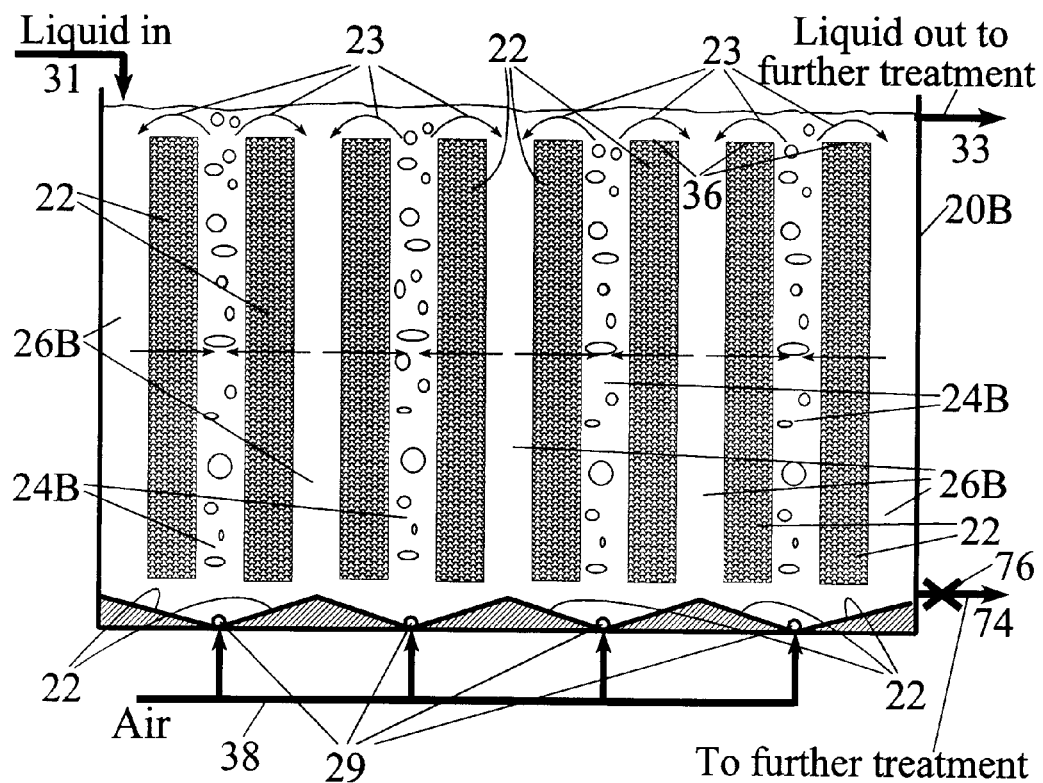
FIG. 4 is a schematic illustration of a multistage immobilized bed bioreactor in reaction position with the recovery (washing) mechanism retracted.

The following description will deal mainly with recovery of gold, but it is to be understood the particles being processed may be other material combined with other suitable microorganisms and conditions.

The system for practicing the present invention uses an immobilized bed bioreactor 14 is similar to the an immobilized bed bioreactor system described in the Karamanev et al. references referred to above and incorporated herein by reference. Referring to FIG. 1 the system used with the present invention includes a vessel 20 having a immobilized bed 22 contained therein and positioned vertically spaced from the walls of the vessel 20 to provide a pair of passages 24 and 26 with opposite sides 22A and 22B of the bed 22 forming one side of each of the passages 24 and 26. The bottom 32 of bed 22 is also spaced from the bottom 28 of the vessel 20 to provide a passage 30 interconnecting the passages 24 and 26. Preferably a cover (not shown) is provided to eliminate the effect of atmospheric elements such as sunlight and rain.

The vessel 20 contains a liquid 34 introduced as indicated at 31 (usually water that may contain added nutrients for the microorganisms being used) up to a level above the top 36 of the bed 22 so that when filled with liquid 34 the passages 24, 26 30 and the liquid above the top 36 form a continuous path of liquid 34 surrounding the bed 22 on 4 sides i.e. top 36, bottom 32 and opposite sides 22A and 22B.

In most applications of this system liquid will be bled from the system as indicated by line 33. In some processes valuable material to be recovered leaves the vessel 20 in the bleed through line 33.

A suitable gas such as air is introduced at the bottom of one of the passages 24 and 26—in the illustration passage 24 via line 38 from a pump 40. The air acts to lift the fluid in the passage 24 and leaves the fluid at the top of the fluid in the vessel 20 i.e. at the fluid air interface adjacent to the top of the vessel 20. The air also participates in the oxidation reaction when pyrite is being processed.

The amount and a rate of air pumping is set to cause circulation of the liquid up though passage 24 across the top 36 of the bed 22 and to flow downward in the passage 24 and through passage 30 back into the bottom end of passage 24 as indicated by the arrow 44. Some of the liquid or fluid 34 as indicated by the arrows 46 also flows through the bed 22 from the passage 26 back into the passage 24 due to the difference in hydrostatic pressure on opposite sides of the bed 22.

At least at the startup of the system particles to be processed are introduced as schematically represented by the line 48 and shut off 50 into the vessel 20 preferably into the up-flow passage 24 and are carried in the flow to the passage 26 from which they enter the bed 22 from the side 22B due to the flow through the bed 22 from the side 22B to the side 22A. These particles are trapped in and form part of the immobilized bed 22.

It will be apparent that the size of the particles, interstices of the bed 22, velocity of fluid 34 etc. must be coordinated to obtain the required movement and deposition of the particles in the bed 22.

If desired nutrients for the microorganisms may be introduced to the fluid 34 in the vessel 20 as schematically indicated by the line 52 and valve 54 and/or may be introduced in the incoming liquid introduced via line 31.

When the treatment of the particles is complete the particles are recovered from the bed 22 for example by creating a sufficiently higher fluid pressure say on one side (e.g. side 22B) and driving the particles out through other side (side 22A) or vice versa. One such system to extract processed particles from the vessel 20 is in the form of washers schematically illustrated in elevated position in FIG. 1. In the illustrated arrangement the washer 70 (in a system with multiple beds 22 obviously there will be one for each bed 22) direct jets 72 of fluid against the adjacent face of the bed 22 to force the particles within the bed to move to and out of the bed at the opposite face of the bed. When multiple adjacent beds are used a single washer 70 modified to direct liquid jets in opposite directions may be used to clean two adjacent beds 22.

When the washers 70 are lowered to operative position as indicated by the arrow 74 fluid ejected from the jets 72 drives the processed particles from the adjacent bed 22 and into the passage on the side of the bed remote from the side of the bed being impinged by the washing fluid. The removed particles are carried from the vessel 20 through the line 56 provided with a suitable shut-off system schematically represented at 58 to a location for further treatment or processing as required.

FIG. 2 is a magnified illustration of section (within the ellipse 10) of the bed 22. As illustrated the bed is form by a one or more textile layers 60 of the required mess size for the particles being processed. The textile layers are contained between a pair of reinforcing grids 62 on each side 22A and 22B of the bed 22.

The particles trapped or immobilized within to form part of the bed 22 are schematically illustrated at 64 are as shown of a variety of different sizes each having the required microorganisms 66 positioned thereon as indicated in FIG. 3. In FIG. 3 the particle 64 has been designated a pyrite crystal and the microorganisms 66 as *T ferrooxidans* cells.

Generally the microorganisms will be added at start-up (e.g. by inoculation) and will continue to multiply and the nutrients will be added preferably continuously to the system in the liquid added via line 31 or through the line 52. However, in some cases microorganisms can be present on the surface of solid particles before the latter are introduced to the bioreactor.

FIG. 4 schematically illustrates a multistage system wherein a plurality of beds are arranged in side by side relationship with tops 36 of the beds 22 below the fluid level to permit flow thereover and are spaced from the bottom of the tank 20B so that liquid can flow completely around each of the beds 22.

Similar to the system shown in FIG. 1 each of the up passages 24B is provided with an air inlet fed from air line 38. If desired each passage 24B may also be provided with a particle inlet and/or a nutrient inlet (not shown) as schematically illustrated at 48 and 52 respectively in FIG. 1.

The bottom 25 of the vessel 20B illustrated in FIG. 4 is formed with a plurality of V-shaped troughs 27 with their apexes 29 positioned directly below and preferably centered on their respective up-flow passage 24B. The air inlets for the up-flow passages 24B are positioned at the apexes 29 to direct air up into the center of their respective up-flow passages. The V-shape troughs held in entraining particles that are intended to be deposited in the bed 22 to form the immobilized particles in the bed 22. In this case the solid particles are removed as indicated by the line 74 having a suitable shut off 76. Where a tapered bottom is provided for each bed 22 when the system of FIG. 1 (as opposed to that of FIGS. 5, 6 and 7) is used the level of liquid in the reactor is lowered and the liquid and solids withdrawn via line 74.

Figure 5:
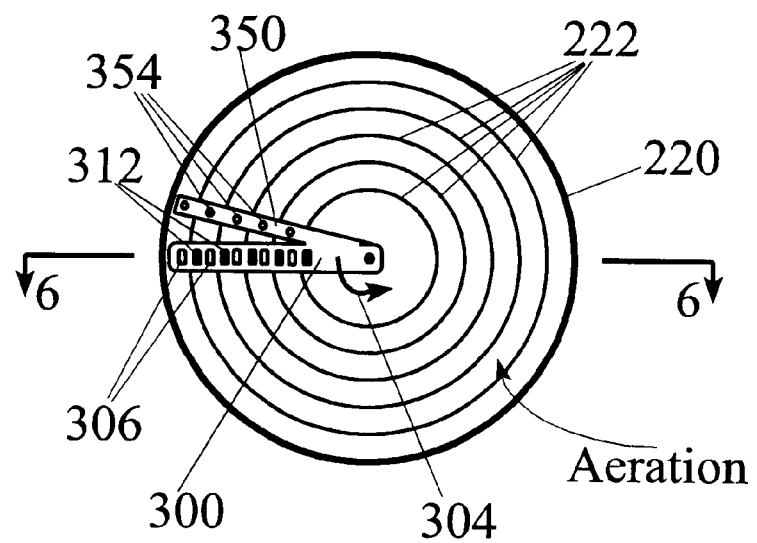
FIG. 5 is a schematic illustration in plan view of a cylindrical immobilized bed bioreactor that may be operated on a continuous or batch basis.
Figure 6:
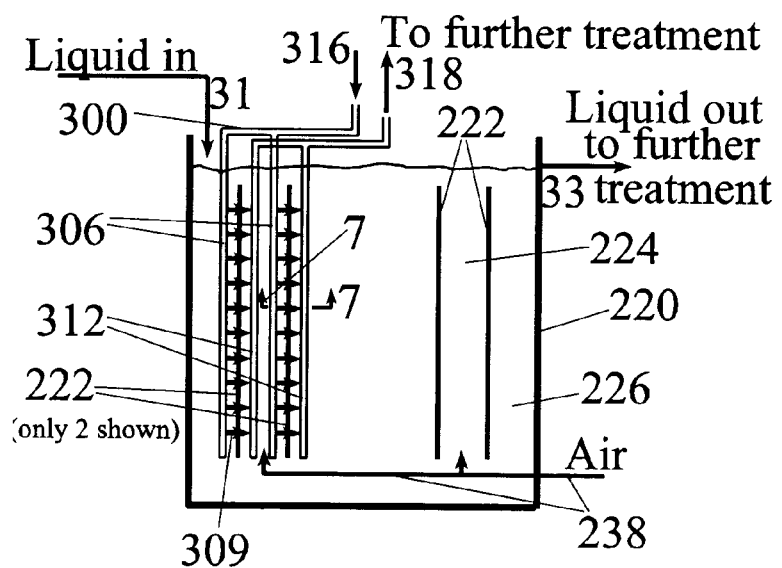
FIG. 6 is a schematic illustration in along the line 6—6 of FIG. 5.
Figure 7:
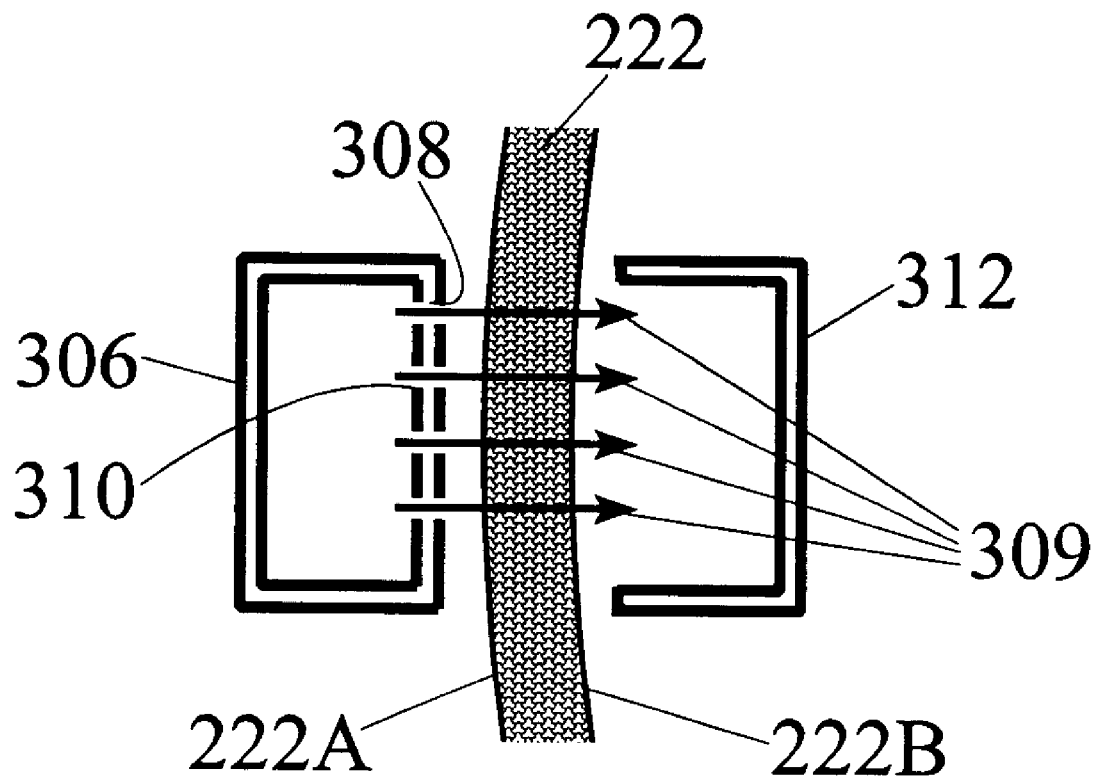
FIG. 7 is a schematic illustration in along the line 7—7 of FIG. 6.

FIGS. 5, 6 and 7 schematically illustrate a system that may be operated on a continuous or batch basis. In this system a cylindrical retaining vessel 220 contains series of annular immobilization beds 222 concentric with the vessel 220. Each of the beds 222 is constructed in the same manner as and equivalent to bed 22 but are in the form of a cylinder. In this arrangement an annular inlet manifold 238 is provided to introduce air (as above described) into the annular up passage 224 formed between a pair of beds 222. Liquids containing nutrients as required are introduces as schematically indicated at 31 and liquid is bled from the system as indicated at 33.

Figure 8:
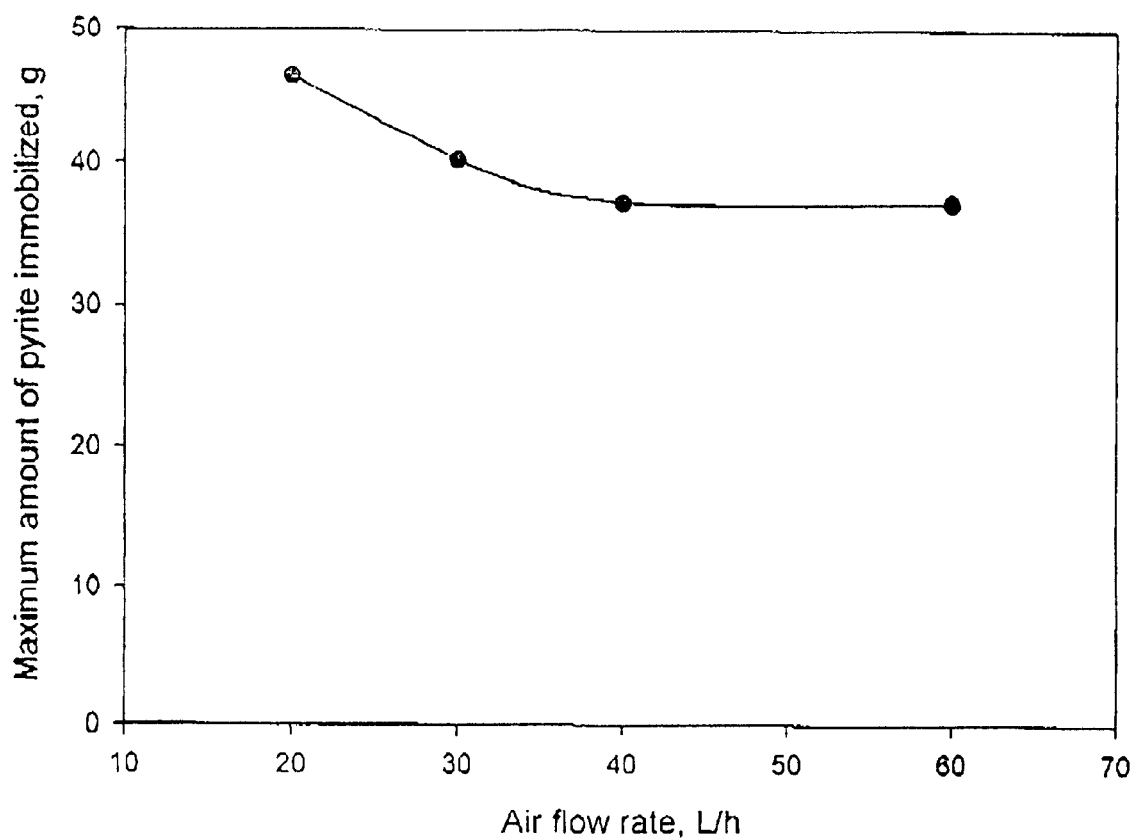
FIG. 8 is a graph showing the effect of the air flow rate on the maximum amount of immobilized pyrite.

In order to remove the processed or treated particles from the system of FIGS. 5, 6 and 7 a substantially radial arm 300 is mounted above the vessel 220 for example on brackets (not shown) for rotation by a motor or the like schematically represented by the arrow 304. At appropriate locations along arm 300 there is provided in alternating relationship a first hollow member 306 and a second having one surface 308 (see FIG. 8) adjacent to (and substantially parallel to (i.e. vertical)) the surface 222A. A plurality of perforations 310 are provided through the surface 308 to direct fluid jets 309 from the member 306 against the adjacent surface 222A of the bed 222 for washing particles (equivalent to particles 64) from the bed 222.

A second hollow member (a collector member) 312 is provided with a perforated surface 314 adjacent to (and substantially parallel to (i.e. vertical)) the surface 222B on the side of the bed 222 radially opposite to the member 306 in a position so that fluid containing particle driven from the bed 222 are received in the member 312 for removal from the system. The members 306 and 312 preferably extend the full axial length (height) of the bed 222 so that particles may be collected over the full length of the bed 222.

In the illustrated arrangement the incoming fluid is indicated by the arrows 316 and the outgoing fluid carrying the particles by the arrows 318.

A suitable branch arm 350 is connected to and moves with (trails) the arm 300 in the direction of rotation of these arms as indicated by the arrow 304. The branch arm 350 is provided with a plurality of particle dispensing lines 354 one for delivering particles into each of the passages 224 (and/or 226). Particles to be processed are provided through the lines 354 to replace the particles extracted by the washing action of the arm 300 locally and shortly after each local area of the bed 222 has been cleansed of particles.

The arm 300 and thus the members 306 and 312 are rotated as represented by the arrow 304 at a rate commensurate with the time the particles are to be subjected to treatment in the system, for example if the particles are intended to remain in the bed 222 for about 2 days the rate of rotation of the arm 300 would be once every 2 days.

It will be apparent that the basic principle of operation of the different embodiments of the invention described above are all the same as described above with respect to FIGS. 1 to 3. It will also be apparent that a washing system similar to that described above and illustrated in FIGS. 5, 6 and 7 with appropriate modification could be applied to the FIG. 1 and/or FIG. 4 embodiments.

It is believed the process and apparatus of the present invention has wide application, however, one of the more significant applications of the present invention is in the treatment of sulphidic minerals or ores.

Generally the mechanisms for the oxidation of the sulfides is as follows.

Direct Oxidation of Sulfides

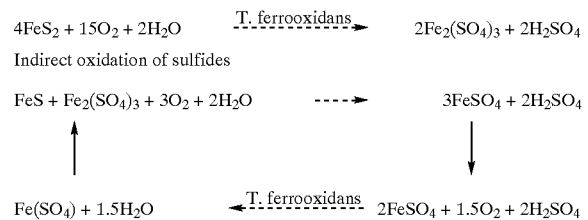

Typical sulphidic minerals or ores that may effectively be processed using the present invention include metal sulfides containing gold, copper, zinc or nickel (and/or other metals such as cobalt, manganese it is believed may be processed using the present invention). Gold is the most unique in that processing of gold requires recovery of the treated particles from the bed and further treating the recovered particles (in known manner) to obtain the gold. The processing of copper, zinc or nickel or other metals requires further treating the bleed in line 33 in known manner to obtain the desired mineral. In either case the solid particles must be removed from the bed and be replenished with new ones to carry out the process as it is the particles that are being processed and provide the source of the material to be recovered.

EXAMPLES

Materials and Methods

The immobilized bed bioreactor was a vertical cylindrical glass vessel with a diameter of 4.7 cm and a height of 37 cm. Its working volume was 500 mL. The cylinder was divided vertically into two semicylindrical sections by means of a porous matrix (bed 22) composed of one or more layers of non-woven polyethylene textile (FIG. 2). The total thickness of the matrix was 30 mm. It was kept in place by two sheets of stainless steel mesh (62) with 1 mm openings. The mesh and the textile formed a sandwich-like structure (bed 22). A membrane air pump (Hagen Inc.) was used to deliver air to the bioreactor. The air flowrate, measured by a calibrated rotameter, was in the range between 10 and 100 L/h. Prior to entering the bioreactor; air was saturated with water in a washing bottle in order to avoid evaporation of liquid in the reactor. The bioreactor was operated at room temperature (22° C.). It was wrapped in aluminum foil in order to avoid the effect of direct sunlight on *Thiobacillus ferrooxidans*. The bioreactor was filled with a 9 K mineral nutrient media of Silverman and Lundgren (Journal of Bacteriology, Vol. 77, p. 642, 1959), containing ammonium sulfate 3 g/L, potassium hydrogen phosphate 0.5 g/L, magnesium sulfate 0.5 g/L, potassium chloride 0.1 g/L, calcium nitrate 0.01 g/L and sulfuric acid for pH correction to pH of 2.2. The microbial culture used was *Thiobacillus ferrooxidans*. It has been isolated from acid mine drainage. The solid phase used was ground pyrite with different size fractions. During the hydrodynamic experiments, the bioreactor was equipped with a magnetic stirrer in order to avoid settling of pyrite. After the immobilization of pyrite, the stirrer was stopped.

The slurry bioreactor was a cylindrical vessel with an ID of 10 cm and a height of 13 cm. Its working volume was 500 mL. It was equipped with an 8 cm long magnetic, Teflon-covered, metallic rod. It was rotated by a magnetic stirrer which was placed below the reactor. The reactor was aerated using the same equipment as the immobilized bed bioreactor described in detail in the Karamanev et al references referred to above.

The mineral salts used were analytical grade. The pyrite used was purchased from Ward Natural Science (St. Catharines, Ontario). It was ground mechanically and only the fraction below 250 $\mu$m was used.

The concentrations of ferrous and ferric ions in the bioreactor were measured using a new spectrophotometric method using sulfosalicilic acid as an indicator. The method allowed to measure both ferric and ferrous ions concentrations in a single sample. The measurement was performed at wavelengths of 425 and 500 nm for each form of iron ions, respectively. The spectrophotometer used was Philips PU-8625. pH was measured by a Fisher-119 pH meter with a precision of 0.01. An optical phase-contrast microscope Microstar (American Optical) was used to observe visually the free suspended microorganisms (magnification 1000x).

The concentration of solid particles in liquid was measured in a sample of 1 mL, withdrawn from the reactor and replaced by 1 mL of distilled water. The sample was placed for 15 min in a test tube to separate the solid particles from liquid by settling. The sediment was dried at 100° C. for 5 hours and weighed after cooling down. The total amount of immobilized pyrite particles was calculated from the difference between the amount of pyrite particles added to the reactor and the amount of particles suspended in liquid.

Hydrodynamic Study of the Process of Pyrite Entrapment

The immobilized bed bioreactor was first studied from the hydrodynamic point of view. The dynamics of pyrite immobilization into the pores of the porous textile was studied. It was found previously that nonwoven textile is very appropriate as a porous matrix. The textile used in this work was described in details elsewhere (Karamanev et al., 1998). Its porosity was 0.995 and the mean fibre diameter was 50 $\mu$m. The rate and total amount of immobilized bed particles was measured as a function of the number of layers of textile, the air flow rate and the particle size. When the number of textile layers was changed, the total thickness of the textile matrix was kept constant (3 cm). In order to occupy the same volume, multiple layers of textile were squeezed, and therefore, the increase in the number of layers led to a decrease in the porosity of the textile matrix.

Figure 9:
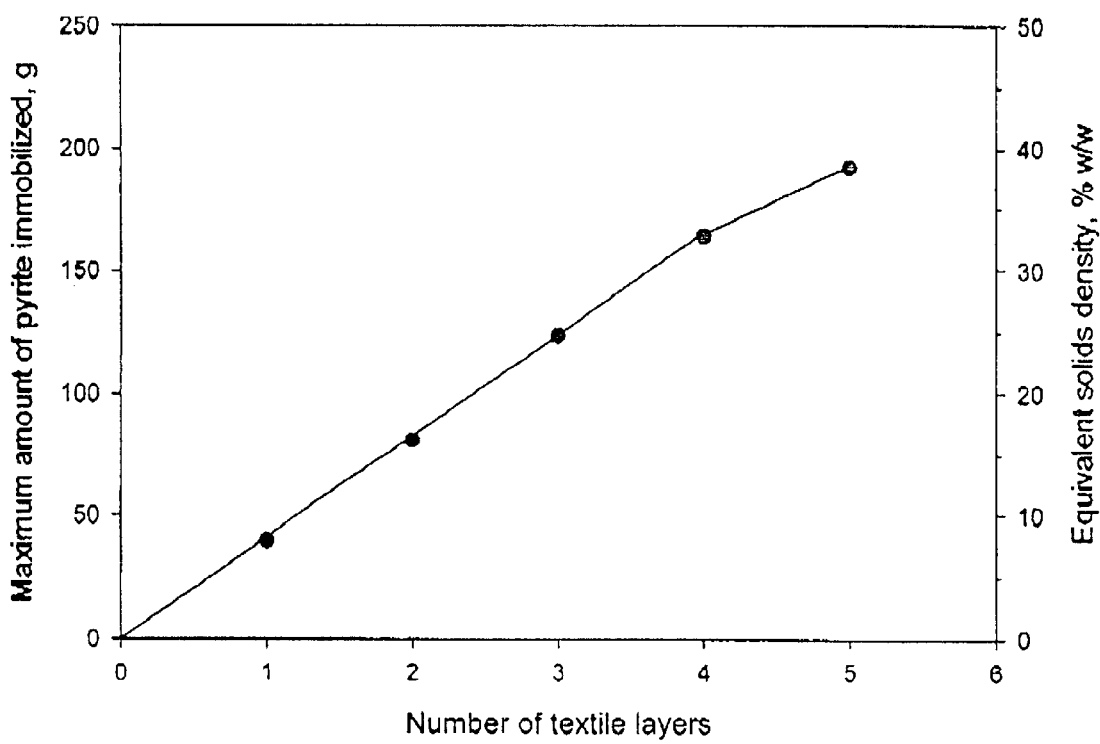
FIG. 9 is a graph showing the relationship between the number of textile layers in the matrix and maximum amount of immobilized pyrite.

The experiments show that if more than 31 g of ground pyrite was added to the specific reactor used at once, they could not be kept in suspension by air bubbles because of the high density, and thus, high settling velocity of pyrite particles. Therefore, pyrite was added to the reactor stepwise. Initially 30 g of pyrite were added, followed by the addition of 3 g every minute during the first 5 minutes. After that, 3 g of pyrite was added each 5 minutes. In the first experiment, the matrix contained a single layer of nonwoven textile. During the repeated addition of pyrite, it was visually observed that the process of pyrite immobilization was very fast: liquid became transparent in 10 to 15 seconds after the addition of pyrite. The concentration of pyrite in suspension, measured experimentally 1 minute after the addition of pyrite, was found to be practically zero. However, after the total addition of 43 g of pyrite, its concentration in slurry increased to 10 g/L. The addition of a new 3 g resulted in the formation of sediment at the reactor bottom. At this point it was assumed that the textile matrix was saturated with pyrite and could not accept more solid particles. The maximum amount of pyrite immobilized was studied as a function of the air flow rate. It can be seen (FIG. 9) that with the increase in the air flow rate, the amount of immobilized pyrite initially decreases, and after 40 L/h it levels off.

Figure 10:
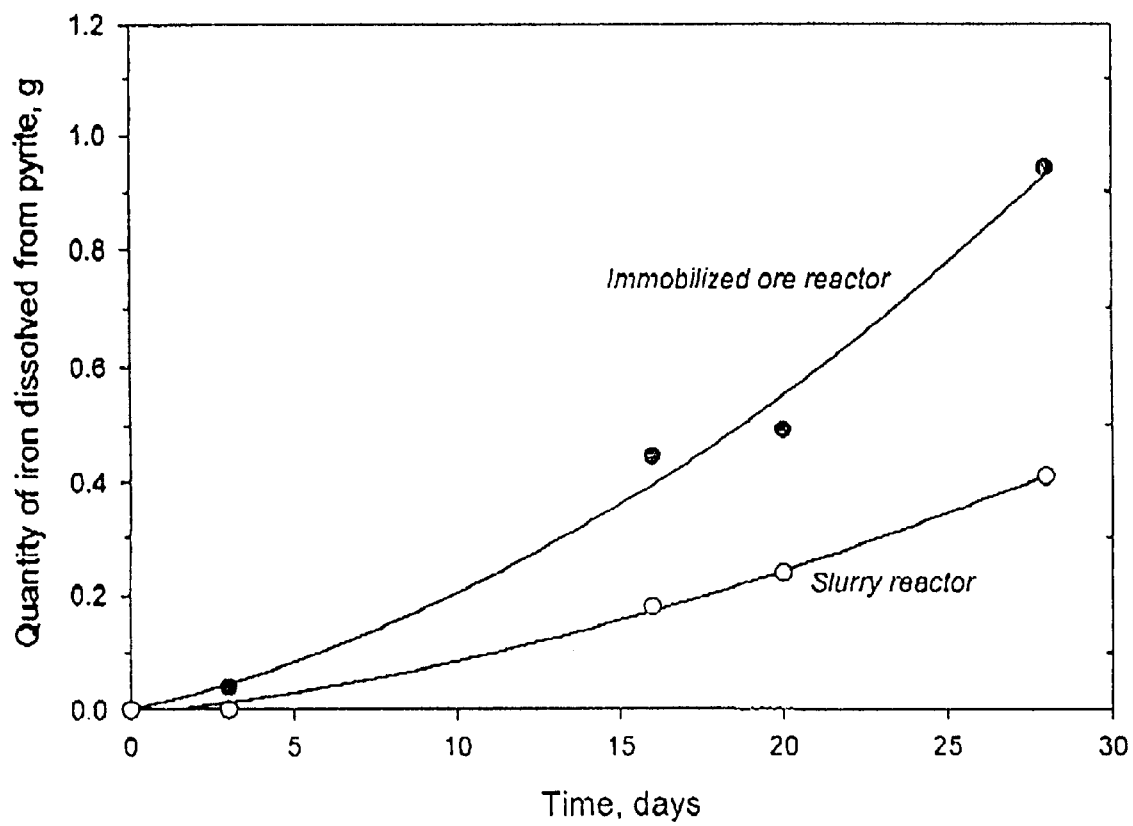
FIG. 10 is a graph showing the change of iron dissolved from pyrite in time.

Similar experiments were performed for the case of 2, 3, 4 and 5 layers of textile in the matrix. The air flow rate was 30 L/h. The relationship between the number of textile layers and the maximum amount of pyrite immobilized is shown in FIG. 10. It can be seen that the increase in the number of textile layers up to 4 led to the proportional increase in the amount of pyrite at saturation and after that the slope slightly decreases. The effect of the number of textile layers and the matrix porosity on the maximal amount of pyrite immobilized (at saturation) is also shown in FIG. 10. The maximum quantity of immobilized pyrite was 192 g which was obtained when 5 layers of textile were used. Since the liquid volume in the reactor was 500 mL, the fraction of solids in the reactor is equal to (192/500)×100= 38.4% w/v. This solids fraction is two times larger than that used in industrial slurry bioreactors which is between 15% and 20% v/w.

Macrokinetic Study of Pyrite Biooxidation

The number of textile layers (4) and the quantity of pyrite (100 g) in this study were determined according to the results of the hydrodynamics of pyrite immobilization given in the previous section. The microbial culture was activated by aerobic cultivation with ferrous sulfate as an energy source. Once activated, the culture medium was used as an inoculate for the immobilized bed bioreactor. The bioreactor was filled with 450 mL of 9 K nutrient salts solution plus 50 ml of inoculate. After the aeration started (30 L air/h), 100 g of pyrite were added to the bioreactor and immobilized in the textile matrix according to the procedure described in the above section. The concentrations of ferrous and total iron as well as pH in liquid were measured in time. In order to compare the rate of pyrite biooxidation in immobilized bed bioreactor with those in a slurry bioreactor, a second, slurry bioreactor was operated in parallel. The conditions in the slurry bioreactor were the same as those in the immobilized soil bioreactor, including the liquid volume, amount of pyrite, air flow rate, liquid composition, inoculate volume, temperature, initial pH. The only difference was in the amount of energy consumption since slurry bioreactor required intensive mechanical mixing, and therefore, higher energy input. Unfortunately, the exact amount of energy input by the mechanical mixer can not be measured in the case of magnetic stirring.

Figure 11:
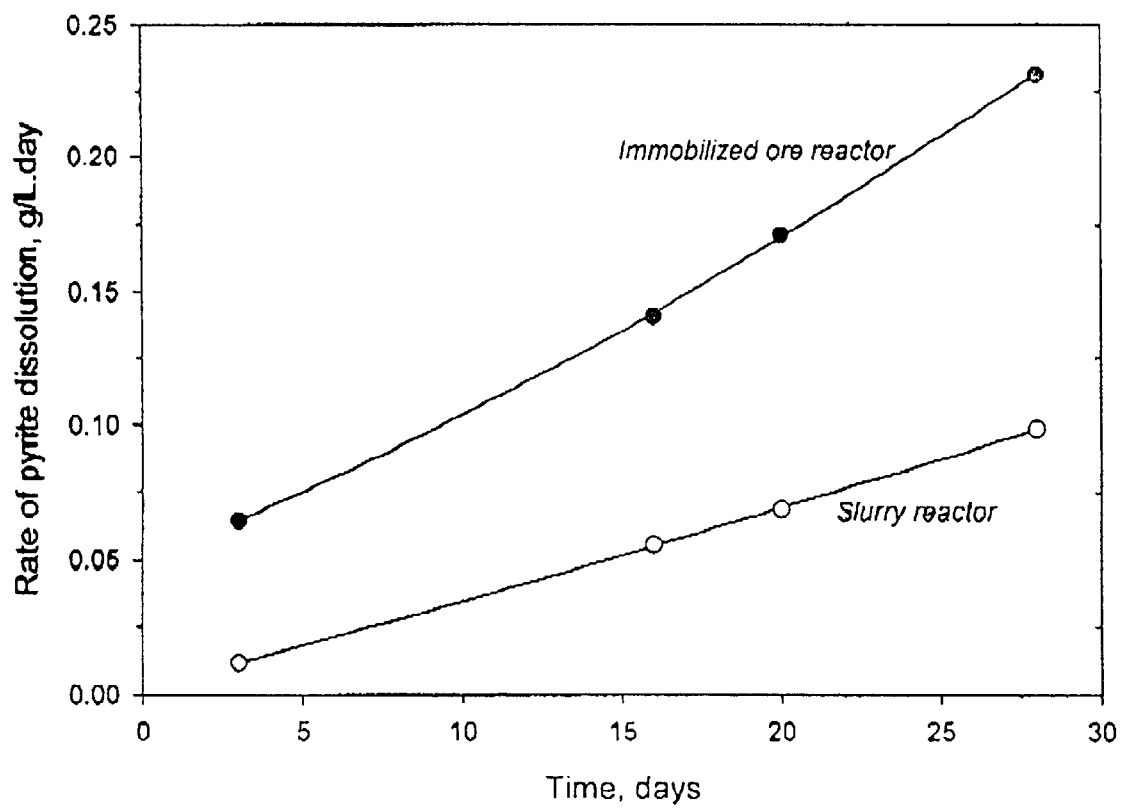
FIG. 11 is a graph showing a comparison between the volumetric bioreaction rates of pyrite oxidation in the immobilized bed and slurry bioreactors.

The amount of iron dissolved from pyrite in both bioreactors as a function of time is shown in FIG. 11. Almost all the dissolved iron in both bioreactors was in the form of ferric ions, which shows that the microbial oxidation of ferrous iron was faster than the chemical reduction of ferric iron by pyrite. The time of biooxidation in both reactors was longer than that reported in industrial processes. However, it was similar to that reported in most laboratory-scale experiments. This difference can be explained by the use of adapted microbial cultures in most industrial operations and non-adapted ones in laboratory experiments, as the one reported in this work. The most important conclusion from FIG. 11 however is that iron concentration in the immobilized soil bioreactor increased much faster than that in the slurry bioreactor. The difference was 2.5 times at the end of the run.

The rate of pyrite dissolution, calculated from the change in the iron concentration in liquid, is shown in FIG. 12. This figure also shows clearly that the immobilized bed bioreactor has much higher volumetric efficiency of pyrite dissolution than a slurry bioreactor; the difference increases with time. At the same time, it requires significantly less energy. It will be apparent that the advantages of the present invention include elimination of the intraparticle friction and
elimination of the power input required to keep solid particles in suspension.

This allowed to significantly increase the volumetric efficiency of the process and to decrease the power requirements. The performance of the bioreactor was tested by the oxidation of pyrite by the bacterium *Thiobacillus ferrooxidans*. Our experimental results showed that:

the volumetric efficiency of biooxidation in the new bioreactor was approx. 2.5 times higher than in a slurry reactor. All operational parameters (including the volumetric pyrite fraction) were kept equal in both bioreactors, except for the power input which was much lower in the new reactor The maximum amount of pyrite that can be treated per unit volume of the new reactor is twice as high as that in a slurry bioreactor.

This novel bioreactor process can be used in different biohydrometallurgical processes, and especially for biologically-assisted gold processing.

Having described the invention, modifications will be evident to those skilled in the art without departing from the scope of the invention as defined in the appended claims.

We claim:

1. A continuous method for bioprocessing particles comprising providing an entrapping matrix for said particles in a vessel, continuously feeding said particles to be processed into said vessel and entrapping said particles in said matrix to form an immobilized bed, providing biologically active microorganisms to treat said particles on said particles in said matrix, circulating a liquid carrying oxygen and/or nutrients for said biologically active microorganisms through said matrix containing said entrapped particles with said biologically active microorganisms thereon, said biologically active microorganisms acting on said particles to breakdown said particles and to provide processed particles in said matrix, continuously removing said processed particles from said matrix and removing said processed particles from said vessel.

2. A method as defined in claim 1 further comprising further treating said processed particles removed from said vessel to recover material.

3. A method as defined in claim 1 wherein said matrix is substantially vertical and said liquid is made to flow upward on one side of said matrix by gas injection and then to flow downward on an opposites side of said matrix and a portion of said liquid to flow through said matrix from said opposite side to said one side.

4. A method as defined in claim 2 wherein said matrix is substantially vertical and said liquid is made to flow upward on one side of said matrix by gas injection and then to flow downward on an opposites side of said matrix and a portion of said liquid to flow through said matrix from said opposite side to said one side.

5. A method as defined in claim 1 wherein said removing said processed particles from said matrix comprises washing said processed particles from said matrix in situ in said vessel by directing wash liquid against one side of said matrix to provide said processed particles removed from said matrix.

6. A method as defined in claim 2 wherein said removing said processed particles from said matrix comprises washing said processed particles from said matrix in situ in said vessel by directing wash liquid against one side of said matrix to provide said processed particles removed from said matrix.

7. A method as defined in claim 3 wherein said removing said processed particles from said matrix comprises washing said processed particles from said matrix in situ in said vessel by directing wash liquid against one side of said matrix to provide said processed particles removed from said matrix.

8. A method as defined in claim 4 wherein said removing said processed particles from said matrix comprises washing said processed particles from said matrix in situ in said vessel by directing wash liquid against one side of said matrix to provide said processed particles removed from said matrix.

9. A method as defined in claim 5 further comprising collecting said processed particles removed from said matrix immediately adjacent to a side of said matrix opposite said one side.

10. A method as defined in claim 6 further comprising collecting said processed particles removed from said matrix immediately adjacent to a side of said matrix opposite said one side.

11. A method as defined in claim 7 further comprising collecting said processed particles removed from said matrix immediately adjacent to a side of said matrix opposite said one side.

12. A method as defined in claim 8 further comprising collecting said processed particles removed from said matrix immediately adjacent to a side of said matrix opposite said one side.

13. A method as defined in claim 2 wherein said particles are pyrite and/or arsenopyrite containing gold particles and said microorganisms act to breakdown said pyrite and/or arsenopyrite by oxidation.

14. A method as defined in claim 4 wherein said particles are pyrite and/or arsenopyrite containing gold particles and said microorganisms act to breakdown said pyrite and/or arsenopyrite by oxidation.

15. A method as defined in claim 6 wherein said particles are pyrite and/or arsenopyrite containing gold particles and said microorganisms act to breakdown said pyrite and/or arsenopyrite by oxidation.

16. A method as defined in claim 8 wherein said particles are pyrite and/or arsenopyrite containing gold particles and said microorganisms act to breakdown said pyrite and/or arsenopyrite by oxidation.

17. A method as defined in claim 12 wherein said particles are pyrite and/or arsenopyrite containing gold particles and said microorganisms act to breakdown said pyrite and/or arsenopyrite by oxidation.

18. A method as defined in claim 1 wherein said liquid is bled from said vessel as a liquid bleed.

19. A method as defined in claim 18 wherein said liquid in said liquid bleed is further treated to recover material.

20. A method as defined in claim 18 wherein said particles are sulfidic minerals containing copper, zinc, nickel, cobalt and/or manganese and said liquid bleed is further treated to recover said copper, zinc nickel, cobalt and/or manganese.

21. A batch process for bioprocessing particles comprising providing an entrapping matrix for said particles in a vessel, filling said vessel with liquid, feeding a batch of said particles to be processed into said vessel and entrapping said particles in said matrix to form an immobilized bed, providing biologically active microorganisms to treat said particles on said particles in said matrix, circulating said liquid carrying oxygen and/or nutrients for said biologically active microorganisms through said matrix containing said entrapped particles with said biologically active microorganisms thereon, said biologically active microorganisms acting on said particles in said batch to breakdown said particles and to provide a batch of processed particles in said matrix, removing said batch of processed particles from said matrix and removing said batch of processed particles and said liquid from said vessel.

22. A process as defined in claim 21 wherein said matrix is substantially vertical and said liquid is made to flow upward on one side of said matrix by gas injection and then to flow downward on an opposites side of said matrix and a portion of said liquid to flow through said matrix from said opposite side to said one side.

23. A process as defined in claim 22 wherein said removing said processed particles from said matrix comprises wash said processed particles from said matrix in situ in said vessel by directing wash liquid against one side of said matrix to provide said processed particles removed from said matrix.

24. A process as defined in claim 21 wherein said particles are pyrite and/or arsenopyrite containing gold particles and said microorganisms act to breakdown said pyrite and/or arsenopyrite by oxidation.

25. A process as defined in claim 22 wherein said particles are pyrite and/or arsenopyrite containing gold particles and said microorganisms act to breakdown said pyrite and/or arsenopyrite by oxidation.

26. A process as defined in claim 23 wherein said particles are pyrite and/or arsenopyrite containing gold particles and said microorganisms act to breakdown said pyrite and/or arsenopyrite by oxidation.

27. A method as defined in claim 21 wherein said particles are sulfidic minerals containing copper, zinc, nickel cobalt and/or manganese and said liquid removed from said vessel is further treated to recover said copper, zinc nickel cobalt and/or manganese.

28. A method as defined in claim 22 wherein said particles are sulfidic minerals containing copper, zinc, nickel, cobalt and/or manganese and said liquid removed from said vessel is further treated to recover said copper, zinc nickel, cobalt and/or manganese.

29. A method as defined in claim 23 wherein said particles are sulfidic minerals containing copper, zinc, nickel, cobalt and/or manganese and said liquid removed from said vessel is further treated to recover said copper, zinc nickel, cobalt and/or manganese.

* * * * *